Figure 1:
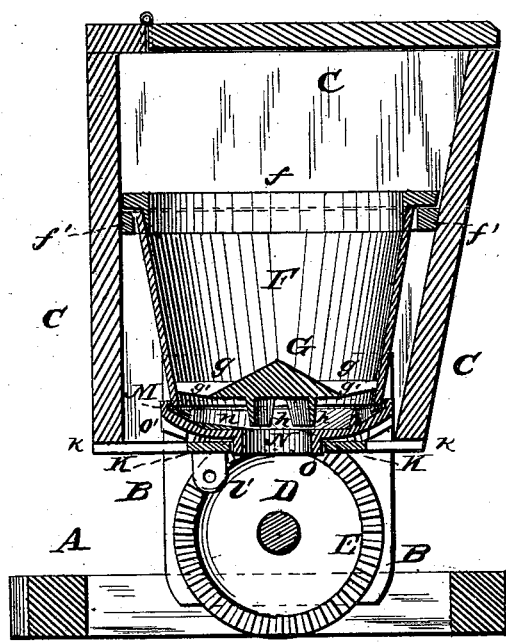

W. H. YOUNG.
Fertilizing Attachment for Grain-Drill.

No. 226,469.  Patented April 13, 1880.

UNITED STATES PATENT OFFICE.

WILLIAM H. YOUNG, OF PALMYRA, NEW YORK.

FERTILIZING ATTACHMENT FOR GRAIN-DRILLS.

SPECIFICATION forming part of Letters Patent No. 226,469, dated April 13, 1880.

Application filed February 14, 1880.

*To all whom it may concern:*

Be it known that I, WILLIAM H. YOUNG, of Palmyra, in the county of Wayne and State of New York, have invented certain new and useful Improvements in Fertilizing Attachments for Grain-Drills; and I do hereby declare the following to be a full, clear, and exact description of the invention, such as will enable others skilled in the art to which it pertains to make and use it, reference being had to the accompanying drawings, which form part of this specification.

My invention relates to a force-feed fertilizer attachment for grain-drills; and its object is to provide a force-feed fertilizer which shall be capable of supplying fertilizing material of any quality in a continuous feed to the grain-drill teeth.

Fertilizers as ordinarily constructed are defective in construction in that they are not adapted to be used for the coarser qualities of fertilizing material; and while they may be used with good effect for the ordinary fine dry phosphates, when coarser materials, as ashes and other cheap waste matter, are employed the parts of the machine are liable to clog, and frequent breakages are thus occasioned, and the work of sowing and distributing fertilizing material is unnecessarily increased.

My invention is designed to obviate these defects, and to provide an automatic fertilizer attachment for grain-drills which will be of simple and durable construction and adapted to feed fertilizing material of any quality to the teeth of the grain-drill.

To this end the invention consists, first, in the combination, with a feed-cup and a distributing-cone located within and near the lower extremity of the cup, said cone being provided on its under surface with two or more flanges or guides, of a revolving feed-wheel provided with a central discharge-opening and on its upper surface with suitable crusher-blades, while its under surface is provided with bevel-gearing.

My invention further consists in a stationary distributing-cone located within and near the lower extremity of the feed-cup, and secured thereto by suitable connecting-arms, and provided on its under surface with two or more flanges or guides.

My invention further consists in the combination, with a feed-cup, of a distributing-cone provided on its under surface with curved flanges or guides and secured within the lower portion of said cup by suitable arms, the fertilizing material being designed to pass over said cone to the feed-wheel through the space between the feed-cup and cone.

My invention further consists in a revolving feed-wheel provided with a central discharge-opening, and having its upper surface beveled and provided with suitable crusher-blades, an annular groove or recess, and an annular space surrounding said discharge-opening, while the under surface of said wheel is provided with bevel-gearing designed to mesh with a suitable drive-wheel.

My invention further consists in certain details of construction and combinations of parts, as will hereinafter be described, and pointed out in the claims.

Figure 2:
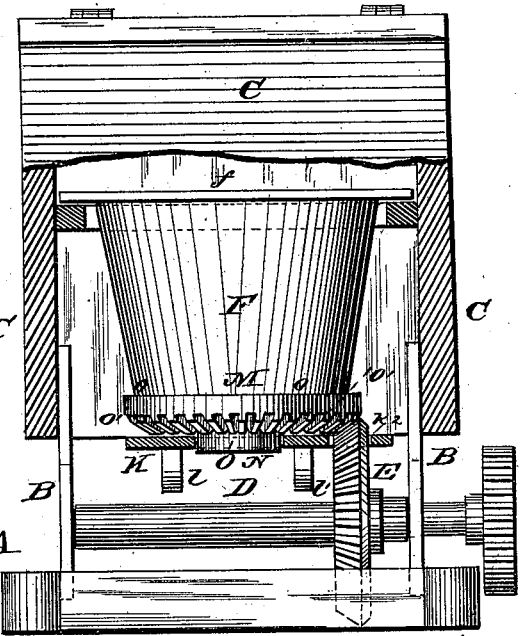
Figure 3:
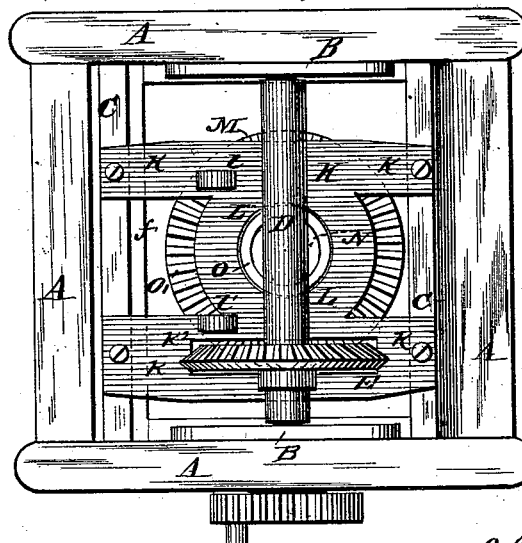
Figure 4:
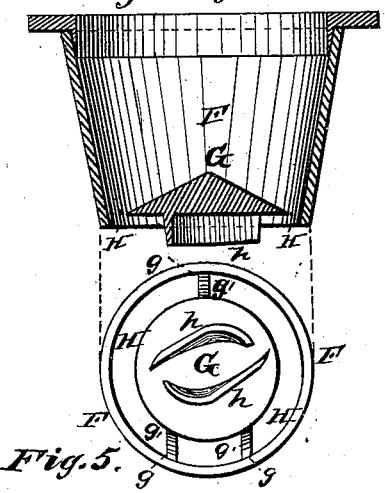
Figure 5:
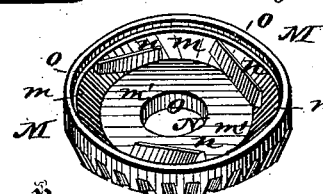

Referring to the drawings, Figure 1 represents a transverse vertical section of a fertilizer hopper and frame, having my improvement connected therewith. Fig. 2 is a front elevation of same, having a portion of the hopper cut away. Fig. 3 is a reverse plan view. Fig. 4 is a detail sectional view of the feed-cup and cone; and Fig. 5 is a view, in perspective, of the feed-wheel.

A represents any suitable frame or support, to which is secured, by suitable brackets B, the fertilizer box or hopper C. This frame A is designed to be secured in any desired manner to the frame of a grain-drill, but is preferably located immediately in rear of the grain-hopper of the drill to permit of a convenient connection with the teeth of the drill, in order that the fertilizing material may be fed into the teeth simultaneously with the grain-seed.

D represents a horizontal shaft, upon which is mounted the beveled drive-wheel E, which operates the feed-wheel, as will be hereinafter described.

Within box C is located a cylinder or feed-cup, F, provided with the top flange, *f*, which is seated upon cleats *f'* within the box C.

The cup F is preferably of ordinary hopper shape, and may be constructed of cast or sheet metal. Within feed-cup F and near the lower end thereof is located a distributing-cone, G, secured to the walls of the feed-cup by any desired number of connecting-arms $g$, the under surface of said arms being beveled, as shown at $g'$.

The annular space H between the feed-cup and cone permits the fertilizing material to pass onto the feed-wheel.

The under surface of cone G is provided with two curved flanges, $h\ h$, the office of same being to guide the fertilizing material to the discharge-opening, as will be described hereinafter, said flanges being cast in same piece with said cone.

K represents a supporting-frame or bottom plate, secured by any suitable means to the lower edges of the front and back of box C by the arms $k\ k\ k\ k$. One side of plate K is provided with an elongated slot, $k^2$, to permit of the meshing of the drive-wheel with the feed-wheel. Plate K is also provided with a central circular opening, L. On the under surface of plate K are provided two perforated lugs or hangers, $l\ l'$, to which the tooth of the grain-drill is to be secured.

M is a feed-wheel, provided with a central discharge-opening, N, and on its under surface with an annular flange or rim, O, which forms a trunnion, which is seated in the circular opening L of bottom plate, K, and is designed to be revolved therein. The under surface of wheel M is also provided with bevel-gearing $o'$, which meshes with drive-wheel E. The upper surface of wheel M is formed with the beveled edge $m$ and annular space $m'$.

Upon the bevel $m$, and at an angle thereto, are cast three or more crusher flanges or blades, $n$, which project slightly upward into the annular opening H, and, in connection with the arms $g$, serve to crush and pulverize the fertilizing material. Near the upper edge of wheel M is provided an annular groove or recess, $o$, into which fits the lower edge of the feed-cup.

The operation of my improved fertilizer attachment is as follows: Motion is imparted to the shaft D from the shaft of the grain-drill, to which the improvement is attached, thus revolving the drive-wheel E, which meshes with feed-wheel M and revolves the latter. Phosphates, ashes, or any desired fertilizing material is placed into hopper C, and passes through the feed-cup F onto cone G, and is distributed through opening H, where it comes in contact with the crusher-blades $n$ of the feed-wheel, which, in connection with the arms $g$, operate to crush and pulverize the fertilizing material and force the same onto the annular space $m'$.

It will be observed that this grinding and crushing action of the blades $m$, in connection with the beveled portions $g'$ of arms $g$, forms an important feature of my invention, since by such means all lumps and coarse matter contained in the fertilizing material are crushed and broken and forced under the cone. Thus such coarse matter, instead of being allowed to clog and impede the action of the parts, is fully utilized. After passing onto the annular space $m'$ the fertilizing material is forced through the discharge-opening N by aid of the curved flanges $h\ h$ of the cone, and thus the same is fed through the tooth of the grain-drill simultaneously with the grain-seed.

The feed of the fertilizing attachment may be regulated by placing pinions of suitable size on an auxiliary shaft between the shaft of the drill and the shaft operating the feed-wheel.

It will be understood that the grain-drill will be provided with as many fertilizing attachments as there are teeth on the drill.

The construction of fertilizing attachment above described will be found to be of great utility, since fertilizing material of all qualities, from the finest phosphates to coarse damp materials, may be used with the desired result.

Many slight variations in the details of construction may be resorted to without departing from the spirit of my invention, and hence I would have it understood that I do not limit myself to the precise form shown.

Having fully described my invention, what I claim as new, and desire to secure by Letters Patent, is—

1. In a force-feed fertilizer, the combination, with a feed-cup and a distributing-cone located within and near the lower extremity of the cup, said cone being provided on its under surface with two or more curved flanges, of a revolving feed-wheel provided with a central discharge-opening, and on its upper surface with crusher-blades, while its under surface is provided with bevel-gearing, substantially as set forth.

2. In a force-feed fertilizer, a stationary distributing-cone located within and near the lower extremity of the feed-cup, and secured thereto by connecting-arms, and provided on its under surface with two or more curved flanges, substantially as set forth.

3. In a force-feed fertilizer, the combination, with a feed-cup, of a distributing-cone provided on its under surface with curved flanges, and secured within the lower portion of said cup by arms, the fertilizing material being designed to pass over said cone to the feed-wheel through the space between the feed-cup and cone, substantially as set forth.

4. In a force-feed fertilizer, a revolving feed-wheel provided with a central discharge-opening, and having its upper surface beveled and provided with crusher-blades, an annular groove or recess, and an annular space surrounding said discharge-opening, while the under surface of said wheel is provided with bevel-gearing, designed to mesh with a suitable drive-wheel, substantially as set forth.

5. In a force-feed fertilizer, the combination, with a supporting-plate secured to the bottom of the fertilizer-box and provided with lugs for the attachment of the drill-tooth, of a revolving beveled feed-wheel seated in said frame and provided with crusher-blades, a feed-cup, and a distributing-cone, the latter provided on its under surface with two or more curved flanges and secured within said feed-cup, substantially as set forth.

6. In a force-feed fertilizer, the combination of a feed-cup, a distributing-cone provided on its under surface with two or more curved flanges and secured within said feed-cup, and a revolving feed-wheel provided on its upper surface with crusher-blades and on its under surface with bevel-gearing with a drive-wheel and actuating-shaft, substantially as set forth.

In testimony that I claim the foregoing I have hereunto set my hand this 4th day of February, 1880.

WILLIAM H. YOUNG.

Witnesses:
ORNON ARCHER,
D. CONANT.